(12) United States Patent
Fan et al.

(10) Patent No.: US 7,287,023 B2
(45) Date of Patent: Oct. 23, 2007

(54) INDEX STRUCTURE FOR SUPPORTING STRUCTURAL XML QUERIES

(75) Inventors: Wei Fan, New York, NY (US); Haixun Wang, Tarrytown, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 10/723,206

(22) Filed: Nov. 26, 2003

(65) Prior Publication Data

US 2005/0114314 A1    May 26, 2005

(51) Int. Cl.
    *G06F 17/30* (2006.01)
(52) U.S. Cl. .................... 707/3; 707/100; 707/102
(58) Field of Classification Search .............. 707/3, 707/100–102
See application file for complete search history.

(56) References Cited

U.S. PATENT DOCUMENTS

| | | | |
|---|---|---|---|
| 2002/0059281 A1* | 5/2002 | Watanabe et al. | 707/100 |
| 2003/0204515 A1* | 10/2003 | Shadmon et al. | 707/100 |
| 2005/0234852 A1* | 10/2005 | Coramutla | 707/1 |

OTHER PUBLICATIONS

Haixun Wang, Sanghyun Park, Wei Fan, Philip s. Yu, ViST: a dynamic index method for querying XML data by tree structures, 2003, 110-121.*

* cited by examiner

*Primary Examiner*—Tim Vo
*Assistant Examiner*—Olubusola Oni
(74) *Attorney, Agent, or Firm*—F. Chau & Associates, LLC

(57) ABSTRACT

The present invention provides a ViST (or "virtual suffix tree"), which is a novel index structure for searching XML documents. By representing both XML documents and XML queries in structure-encoded sequences, it is shown that querying XML data is equivalent to finding (non-contiguous) subsequence matches. A variety of XML queries, including those with branches, or wild-cards ('*' and '//'), can be expressed by structure-encoded sequences. Unlike index methods that disassemble a query into multiple sub-queries, and then join the results of these sub-queries to provide the final answers, ViST uses tree structures as the basic unit of query to avoid expensive join operations. Furthermore, ViST provides a unified index on both content and structure of the XML documents, hence it has a performance advantage over methods indexing either just content or structure. ViST supports dynamic index update, and it relies solely on B+Trees without using any specialized data structures that are not well supported by common database management systems (hereinafter referred to as "DBMSs").

2 Claims, 9 Drawing Sheets

$Doc_1$ : $(P, \epsilon)(S, P)(N, PS)(v_1, PSN)(L, PS)(v_2, PSL)$ $Doc_2$ : $(P, \epsilon)(B, P)(L, PB)(v_2, PBL)$ $Q_1$ : $(P, \epsilon)(B, P)(L, PB)(v_2, PBL)$ $Q_2$ : $(P, \epsilon)(L, P*)(v_2, P*L)$ (a) XML docs and queries in structure-encoded sequences (b) A tree structure for $Doc_1$ and $Doc_2$

```
<!ELEMENT  purchases  (purchase*)>
<!ELEMENT  purchase   (seller, buyer)>
<!ATTRIST  seller     ID ID location CDATA name CDATA>
<!ELEMENT  seller     (item*)>
<!ATTRIST  buyer      ID ID location CDATA name CDATA>
<!ELEMENT  item       (item*)>
<!ATTRIST  item       name CDATA manufacturer CDATA>
```

(Prior Art)
FIG. 1

$$\begin{aligned}\mathcal{D} = \ &(P, \epsilon), (S, P), (N, PS), (v_1, PSN), (L, PS), (M, PSI),\\
&(v_2, PSIM), (N, PSI), (v_3, PSIN), (L, PSI), (M, PSII),\\
&(v_4, PSIIM), (L, PS), (N, PSI), (v_5, PSIN), (L, PS),\\
&(v_6, PSL), (B, P), (L, PB), (v_7, PBL), (N, PB), (v_8, PBN)\end{aligned}$$

INDEX STRUCTURE FOR SUPPORTING STRUCTURAL XML QUERIES

BACKGROUND OF THE INVENTION

1. Field of the Invention

The present invention relates to databases and, more particularly, to an index structure for searching XML documents.

2. Description of the Related Art

XML provides a flexible way to define semi-structured data. For instance, purchase records that contain information of buyers and sellers can be described by the document type definition (hereinafter referred to as "DTD") schema shown in FIG. 1. DTD is a common schema specification method for XML documents. A sample XML document based on this DTD is shown in FIG. 3.

The ability to express complex structural or graphical queries is one of the major focuses in XML query language design. In FIG. 2, four sample queries in graph form are shown. It is well-known in the art that querying XML data is equivalent to finding sub-structures of the data graph that match the query structure.

Many of the current approaches to querying XML data create indexes on paths (e.g., "/P/S/I/M" as in $Q_1$) or nodes in DTD trees. Path indexes can answer simple queries such as $Q_1$ efficiently. However, queries involving branching structures ($Q_2$, for instance) usually have to be disassembled into multiple sub-queries, each sub-query corresponding to a single path in the graph. The results of these sub-queries are then combined by expensive "join" operations to produce final answers. For the same reason, these methods are also inefficient in handling '*' or '//' queries ($Q_3$ and $Q_4$, for instance), which too, correspond to multiple paths. To avoid expensive join operations, some index methods create special index entries for frequently occurring multiple-path queries (commonly referred to as "refined paths"). The potential disadvantages of this approach include: 1) there is a need to monitor query patterns; 2) it is not a general approach because not every branching query is optimized; and 3) the number of refined paths can have a huge impact on the size and the maintenance cost of the index.

Moreover, to retrieve semi-structured data (e.g., XML documents) efficiently, it is essential to index on both structure and content of the XML data. Nevertheless, many algorithms index on structure only, or index on structure and content separately, which means, for instance, attribute values in $Q_2$, $Q_3$, and $Q_4$ are not used for filtering in the most effective way.

Another important aspect to XML indexing is whether the index structure supports dynamic data insertion, deletion, and update, and whether the index depends on specialized data structures not well-supported by database systems.

SUMMARY OF THE INVENTION

In one aspect of the present invention, a method of generating a virtual suffix tree (ViST) structure for searching XML documents is provided. The method comprises receiving one or more XML documents; converting the one or more XML documents into one or more structure-encoded sequences. The method further comprises generating the ViST structure comprising: generating a D-Ancestor index; generating an S-Ancestor index; and generating a doc-ID index.

In a second aspect of the present invention, a method of answering an XML query is provided. The method comprises receiving an XML query; transforming the XML query into a structure-encoded sequence; and searching a ViST structure using the structure-encoded sequence and returning one or more document IDs.

In a third aspect of the present invention, a method of dynamically updating the ViST structure is provided. The method comprises receiving a new XML document; transforming the XML document into a structure-encoded sequence; inserting each element of the sequence into D-Ancestor B$^+$Tree; assigning a new label if the step of inserting creates a new node; and inserting the new label into the S-Ancestor B$^+$Tree.

In a fourth aspect of the present invention, a machine-readable medium having instructions stored thereon for execution by a processor to perform a method of generating a virtual suffix tree (ViST) structure for searching XML documents is provided. The method comprises receiving one or more XML documents; converting the one or more XML documents into one or more structure-encoded sequences. The method further comprises generating the ViST structure comprising: generating a D-Ancestor index; generating an S-Ancestor index; and generating a doc-ID index.

In a fifth aspect of the present invention, a machine-readable medium having instructions stored thereon for execution by a processor to perform a method answering an XML query is provided. The method comprises receiving an XML query; transforming the XML query into a structure-encoded sequence; and searching a ViST structure using the structure-encoded sequence and returning one or more document IDs.

In a sixth aspect of the present invention, a machine-readable medium having instructions stored thereon for execution by a processor to perform a method of dynamically updating the ViST structure is provided. The method comprises receiving a new XML document; transforming the XML document into a structure-encoded sequence; inserting each element of the sequence into D-Ancestor B$^+$Tree; assigning a new label if the step of inserting creates a new node; and inserting the new label into the S-Ancestor B$^+$Tree.

BRIEF DESCRIPTION OF THE DRAWINGS

The invention may be understood by reference to the following description taken in conjunction with the accompanying drawings, in which like reference numerals identify like elements, and in which:

FIG. 1 shows a document type definition schema;

FIG. 4 shows a structure-encoded sequence, in accordance with one embodiment of the present invention;

FIG. 9(*b*) shows an index after insertion, in accordance with one embodiment of the present invention.

DETAILED DESCRIPTION OF PREFERRED EMBODIMENTS

Figure 2:
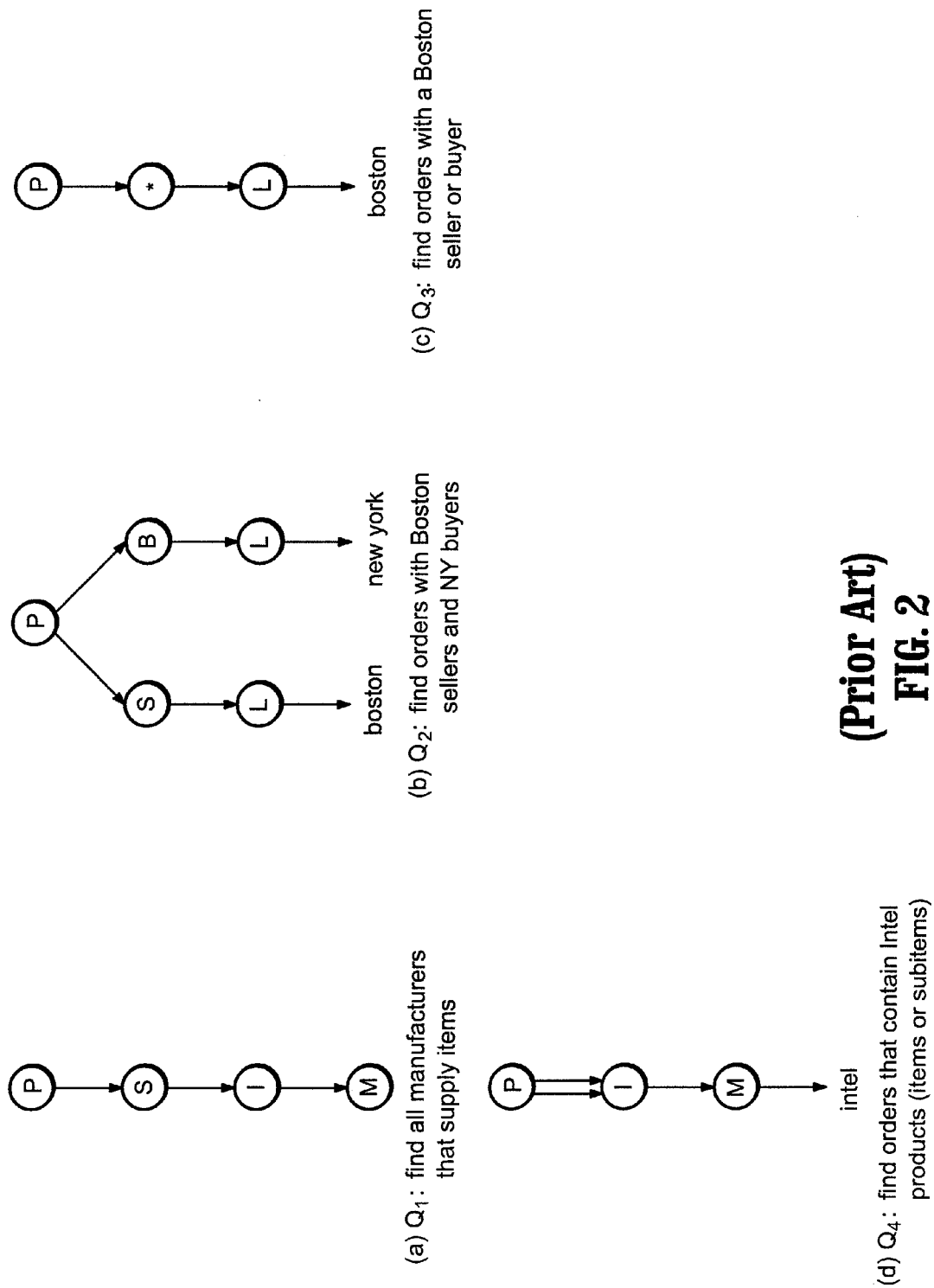
FIG. 2 shows four sample XML queries.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It is to be understood that the systems and methods described herein may be implemented in various forms of hardware, software, firmware, special purpose processors, or a combination thereof. In particular, the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachers herein, one of ordinary skill in the related art will be able to contemplate these and similar implementations of the present invention.

With the growing importance of XML in data exchange, much research has been done in providing flexible query facilities to extract data from structured XML documents. The present disclosure presents ViST (or "virtual suffix tree"), which is a novel index structure for searching XML documents. By representing both XML documents and XML queries in structure-encoded sequences, it is shown that querying XML data is equivalent to finding (non-contiguous) subsequence matches. A variety of XML queries, including those with branches, or wild-cards ('*' and '//'), can be expressed by structure-encoded sequences. Unlike index methods that disassemble a query into multiple sub-queries, and then join the results of these sub-queries to provide the final answers, ViST uses tree structures as the basic unit of query to avoid expensive join operations. Furthermore, ViST provides a unified index on both content and structure of the XML documents, hence it has a performance advantage over methods in-dexing either just content or structure. ViST supports dynamic index update, and it relies solely on B$^+$Trees without using any specialized data structures that are not well supported by common database management systems (hereinafter referred to as "DBMSs").

The ViST structure comprises two parts, the "D-Ancestor index" and the "S-Ancestor index." The D-Ancestor index indexes nodes by their ancestor-descendant relationships in the original XML document tree. The S-Ancestor index indexes nodes by their ancestor-descendant relationships in the virtual suffix tree. By combining the two parts, structural XML queries can be answered in a way similar to substring matching using suffix trees.

ViST also answers challenges in index structure design. Unlike many previous methods that index either just structure or content of the XML data, ViST unifies structural indexes and value indexes into a single index. In addition, a technique called dynamic virtual suffix tree labeling is proposed, in which structural XML queries, as well as dynamic index update, can be performed directly on B$^+$Trees, instead of relying on specialized data structures such as suffix trees that are not well supported by DBMSs.

It is believed that ViST is the first approach that provides all of the following features at the same time. The list below is not intended, and should not be construed as an exhaustive list.

(1) Unlike most indexing methods that disassemble a structured query into multiple sub-queries, and then join the results of these sub-queries to provide the final answers, ViST uses tree structures as the basic unit of query to avoid expensive join operations.

(2) ViST provides a unified index on both the content and the structure of XML documents, hence it has a performance advantage over methods indexing either just content or structure.

(3) Unlike some XML indexing approaches that rely on specialized data structures such as the suffix tree, which is not well-supported for disk-based data, we rely on the mature disk-based B$^+$ Tree index.

(4). ViST supports dynamic data insertion and deletion.

Most known XML indexing algorithms rely on specialized data structures, for example, suffice trees, path trees, etc. These structures are not well-supported in the commercial DBMS's. Thus, in order to support such an XML index, the DBMS's must implement these specialized data structures. This is not an easy task to implement, however, because of the consideration of database issues such as concurrency control, locking, etc. On the other hand, the B$^+$Tree overcomes these issues.

Structure-encoded sequences, which are sequential representations of both XML data and XML queries, will now be presented. It will be shown that querying XML is equivalent to finding subsequence matches.

The purpose of modeling XML queries through sequence matching is to avoid as many unnecessary join operations as possible in query processing. That is, structure-encoded sequences are used, instead of nodes or paths (as is commonly used), as the basic unit of query. Through sequence matching, structured queries are matched against structured data as a whole, without breaking down the queries into sub-queries of paths or nodes and relying on join operations to combine their results. Several common XML databases (e.g., Digital Bibliography & Library Project, Internet movie database, etc.) contain a large set of records of the same structure. Other XML databases may not be as homogeneous. A synthetic XMARK dataset consists of one (generally large) record. However, each sub-structure in XMARK's schema (e.g., items, closed auction, open auction, person, etc.) contains a large number of instances in the database. Therefore, each sub-structure should have an index of its own. The sequence matching approach described herein ensures that queries confined within the same structure are matched as a whole.

Figure 3:
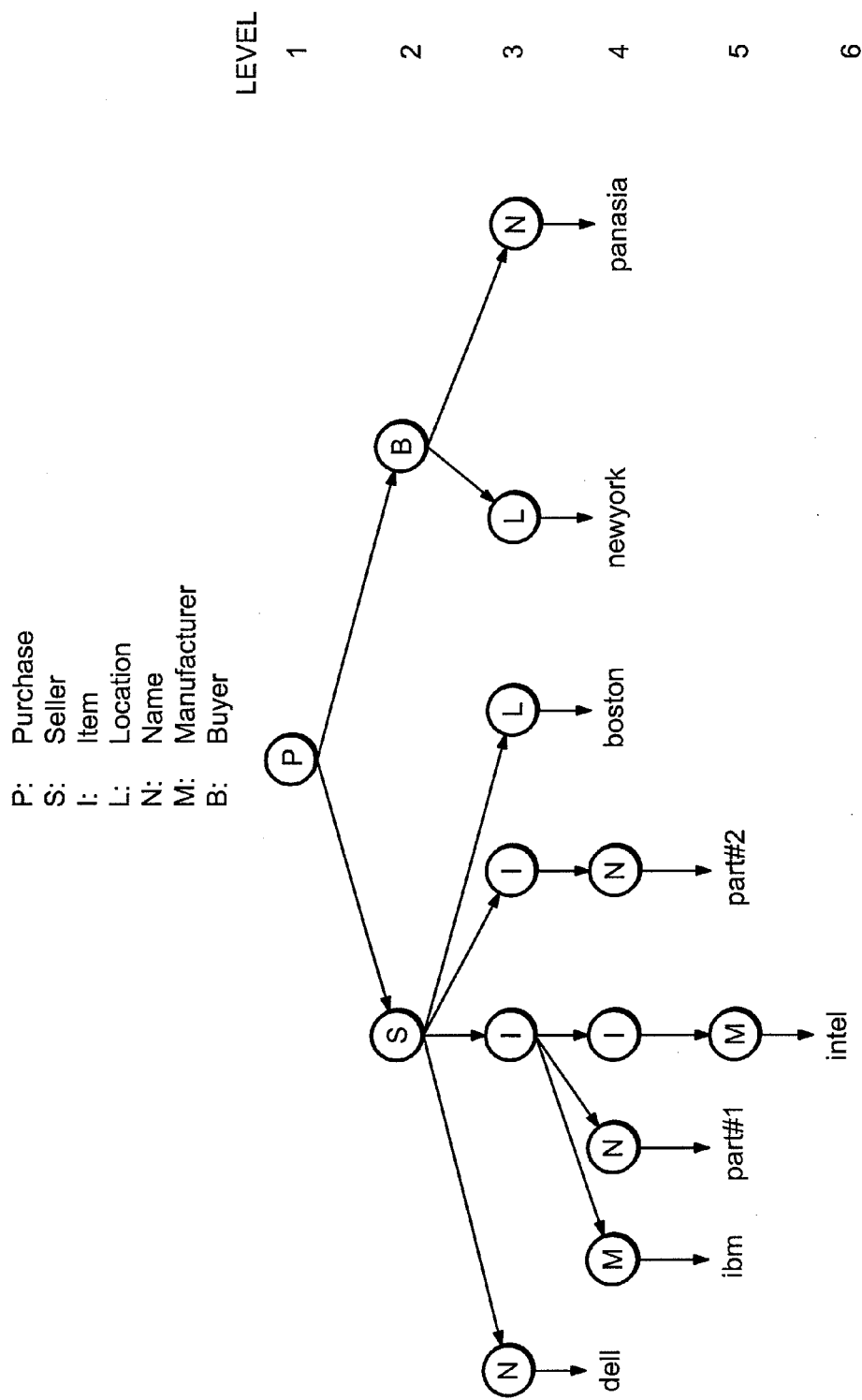
FIG. 3 shows a table of structure-encoded sequences, in accordance with one embodiment of the present invention.

Consider the XML purchase record shown in FIG. 3. Capital letters represent names of elements/attributes, and a hash function, h( ) encodes attribute values into integers. Suppose, for instance, $v_1$=h("dell") and $v_2$=h("ibm"). Values $v_1$ and $v_2$ represent "dell" and "ibm," respectively.

An XML document is represented by the preorder sequence of its tree structure. For the purchase record example of FIG. 3, its preorder sequence is shown below.

$$PSNv_1IMv_2Nv_3IMv_4INv_5Lv_6BLv_7Nv_8$$

Because isomorphic trees may produce different preorder sequences, an order among sibling nodes is enforced. The DTD schema embodies a linear order of all elements/attributes defined therein. If the DTD is not available, the lexicographical order of the names of the elements/attributes is used. For example, under lexicographical order, the Buyer node will precede the Seller node under Purchase. Multiple occurring child nodes (such as the Item nodes under Seller) are ordered arbitrarily. As shown below, branching queries generally require special handling when multiple occurring child nodes are involved.

To reconstruct trees from preorder sequences, extra information is needed. A structure-encoded sequence, as defined herein, is a two dimensional sequence, where the second dimension preserves the structure of the data. The structure-encoded sequence is derived from a prefix traversal of a semi-structured XML document. The structure-encoded sequence is a sequence of (symbol, prefix) pairs:

$$D=(a_1, p_1), (a_2, p_2), \ldots, (a_n, p_n)$$

where $a_1$ represents a node in the XML document tree, (of which $a_1, \ldots, a_n$ is the preorder sequence), and $p_i$ is the path from the root node to node $a_i$.

Based on this definition of the structure-encoded sequence, the XML purchase record of FIG. 3 can be converted to the structure-encoded sequence in FIG. 4. As shown in FIG. 4, the underlined non-contiguous subsequence of D matches query $Q_2$ shown below in Table 2. The prefixes in the sequential representation contain much redundant information. However, because, duplicate (symbol, prefix) pairs are not stored in the index and the prefixes can be encoded easily (as shown below), the prefixes will not create problems in index size or storage.

'//' symbol as a place holder. As shown below, '*' and '//' are handled as range queries by ViST in sequence matching. (Example: $Q_3$, $Q_4$)

The purpose of introducing structure-encoded sequences is to model XML queries through sequence matching. In other words, querying XML is equivalent to finding (non-contiguous) subsequence matches. This by queries $Q_1, \ldots, Q_4$ in Table 2 above. The structure-encoded sequence of $Q_1$ is a subsequence of D. $Q_1$ is a sub tree of the XML purchase record that D represents. The sequence of $Q_2$ is a non-contiguous subsequence of D, and again, $Q_2$ is a sub tree of the XML purchase record. The same can be said for queries $Q_3$ and $Q_4$, where prefix paths contain wild-cards '*' and '//', if '*' is matched with any single symbol in the path, and '//' is matched with any portion of the path.

The obvious benefits of modeling XML queries through sequence matching is that structural queries can be processed as a whole instead of being broken down into smaller query units (e.g., paths or nodes of XML document trees), as combining the results of the sub-queries by join operations is often expensive. In other words, structures are used as the basic unit of query.

Most structural XML queries can be performed through direct subsequence matching. The only exception occurs when a branch has multiple identical child nodes. For instance, in $Q_5$=/A[B/C]/B/D, the two nodes under the branch are the same: B. In this case, the tree isomorphism problem cannot be avoided by enforcing sibling orders because the two nodes are identical. As a result, the preorder sequences of XML data trees that contain such a branch can have two possible forms. In order to find all matches, Q5 is converted to two different sequences, namely, (A,$\epsilon$)(B,A)(C,AB)(B,A)(D,AB) and (A,$\epsilon$)(B,A)(D,AB)(B,A)(C,AB). Matches for these two sequences are separately found and their results are combined in a "union" operation. On the other hand, false matches may be found if the indexed documents contain branches with identical child nodes. Then, multiple queries asked and a "set difference" on their results is computed. If, in the unlikely case, the query contains a large number of same child nodes under a branch, the tree can be disassembled at the branch into multiple trees. Join operations can be used to combine their results. For instance, $Q_5$ can be disassembled into two trees: (A,$\epsilon$)(B,A)(C,AB) and (A,$\epsilon$)(B,A)(D,AB). It should be noted that $Q_5$ is a special case where each split tree is a single path.

TABLE 2

XML Queries in Path Expression and Sequence Form

| Path Expression | Structure-Encoded Sequence |
|---|---|
| $Q_1$: /Purchase/Seller/Item/Manufacturer | (P, $\epsilon$)(S, P)(I, PS)(M, PSI) |
| $Q_2$: /Purchase[Seller[Loc = $v_5$]]/Buyer[Loc = $v_7$] | (P, $\epsilon$)(S, P)(L, PS)($v_5$, PSL)(B, P)(L, PB)($v_7$, PBL) |
| $Q_3$: /Purchase/*[Loc = $v_5$] | (P, $\epsilon$)(L, P*)($v_5$, P*L) |
| $Q_4$: /Purchase//Item[Manufacturer = $v_3$] | (P, $\epsilon$)(I, P//)(M, P//I)($v_3$, P//IM) |

In the same spirit, XML queries are can be converted into structure-encoded sequences. The queries in FIG. 2 can be transformed to the structure-encoded sequences in Table 2. The following rules are observed in the conversion:

(1) Just like converting XML data, preorder sequences are used to represent queries. (Example: $Q_1$, $Q_2$).
(2) Wild-card nodes ('*' and '//') are discarded. However, the prefix paths of their sub nodes will contain a '*' or After both XML data and XML queries are converted to structure-encoded sequences, it is straightforward to one of ordinary skill in the art to devise a brute force algorithm to perform (non-contiguous) sequence matching. The rest of this disclosure will describe building a dynamic index structure so that such matches can be found efficiently.

ViST will now be presented in three stages. First, a naive algorithm is presented. The naive algorithm, based entirely on suffix trees, requires traversal of a large portion of the tree structure for noncontiguous subsequence matching. Second, relationships indexed suffix tree (hereinafter referred to as "RIST") is presented. RIST improves the naive algorithm by using B+Trees to index suffix tree nodes. Finally, ViST is presented. ViST is an index structure having the same functionality as RIST but relies exclusively on B+Trees.

The desiderata of an XML indexing method include:
1. The index method should support structural queries directly. With structure-encoded sequences, this requirement is equivalent to having efficient support for (non-contiguous) subsequence matching.
2. Instead of relying on specialized data structures such as suffix trees, the index method should leverage well-supported database indexing techniques such as B+Trees.
3. The index structure should allow dynamic data insertion, deletion, etc.

Figure 5:
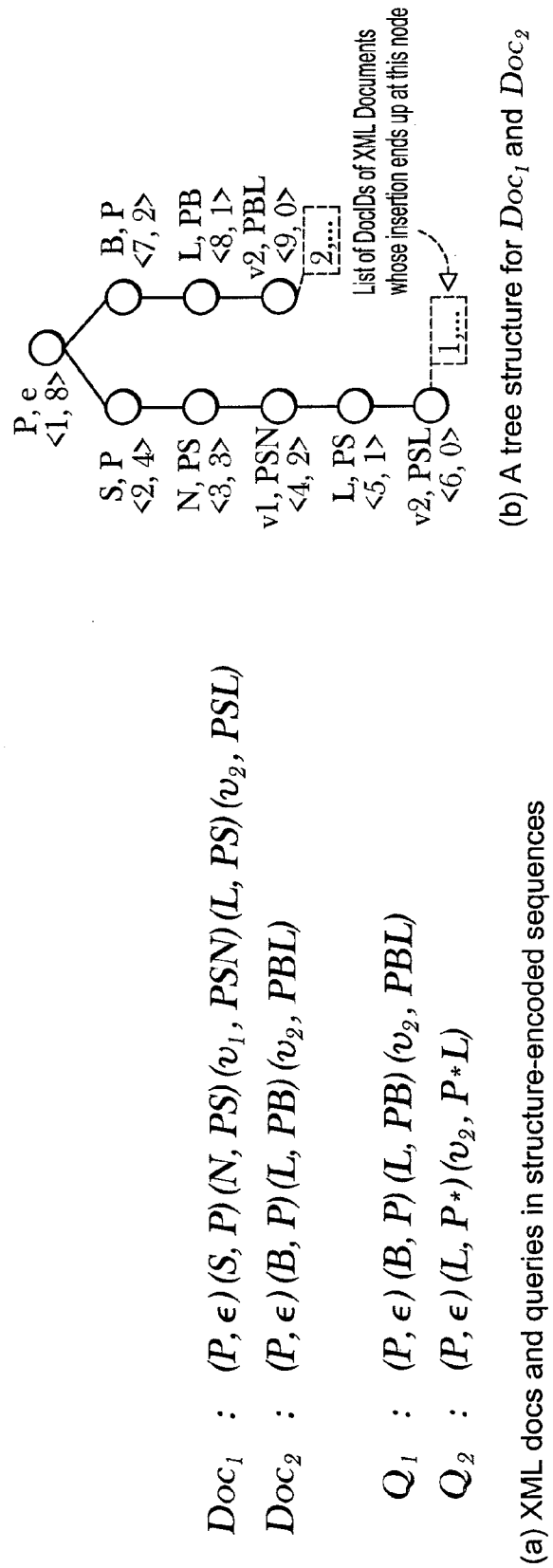
FIG. 5 shows using a suffix-tree-like structure to index structure-encoded sequences for non-contiguous matching, in accordance with one embodiment of the present invention.

FIG. 5 shows an example of using a suffix-tree-like structure to index structure-encoded sequences for non-contiguous matching. Two sequences, $Doc_1$ and $Doc_2$, are inserted into the suffix tree. Originally, the elements in the sequences represent nodes in the XML document trees, from which the sequences are derived. Now, the elements also represent nodes in the suffix tree. Because the nodes are involved in two different trees, two kinds of ancestor-descendant relationships among the sequence elements arise: 1) the ancestor-descendant relationships of the nodes that they represent in the original XML document tree; and 2) the ancestor-descendant relationships of the nodes that they represent in the suffix tree. The first relationship is called the D-Ancestorship. For instance, element (S,P) is a D-ancestor of (L,PS). The second relationship is called the S-Ancestorship. For instance, element $(v_1,PSN)$ is an S-Ancestor of (L,PS).

The algorithm below presents a naive method for non-contiguous subsequence matching:

```
Input: Q = q₁, ... ,qₖ, a query sequence
       S, a suffix tree for a set of sequences
Output: all occurrences of Q in S/* Search begins at the root of the
suffix tree */NaiveSearch(S→root, 1);
Function NaiveSearch(n, i)
  if i ≤ k then
    for each node c that is a descendent of node n do
      /* n is an S-Ancestor of c */
      if c matches qᵢ then
        /* n is a D-Ancestor of c */NaiveSearch(c, i + 1);
      end
    end
  else
    Output all document IDs attached to the nodes under node n;
  end
```

Suppose node x is one of the nodes matching $q_1, \ldots, q_{i-1}$. To match the next element $q_i$, we check all the nodes under x, which are the nodes satisfying the S-Ancestorship. Among them, we find those that match $q_i$'s (Symbol, Prefix) pair, which are the nodes satisfying the D-Ancestorship, as Prefix encodes D-Ancestorship in the XML document tree. For example, to match $Q_2$, we start with the root node, which matches the first element of $Q_2$, (P,ϵ). Then, we search under the root for all nodes that match (L,P*), which (L,PS) and (L,PB). Finally, we search for $(v_2,PSL)$ (wildcard '*' in the query is instantiated to 'S' by the previous match) under the node labeled (L,PS), and $(v_2,PBL)$ under the node labeled (L,PB).

In essence, the algorithm above searches nodes first by S-Ancestorship (searching under a suffix tree node), and then D-Ancestorship (matching nodes by symbols and prefixes). The algorithm supports structural query. However, there are several difficulties in using a suffix tree to index structure-encoded sequences. First, searching for nodes satisfying both S-Ancestorship and D-Ancestorship is extremely costly because we need to traverse a large portion of the subtree for each match. Second, suffix trees are main memory structures that are seldom used for disk resident data, and most commercial DBMSs do not have support for such structures.

RIST improves the naive algorithm by eliminating costly suffix tree traversal. With RIST, when we reach a node X after matching a prefix of the query, we can "jump" directly to those nodes Y to which X is both a D-Ancestor and an S-Ancestor. Thus, we no longer need to search among the descendants of X to find such Y s one by one. More specifically, RIST is designed as follows:
1. We index nodes in the suffix tree by their (Symbol, Prefix) pairs. This is realized by a B+Tree. It enables us to search nodes by (Symbol, Prefix), that is, by D-Ancestorship, because Prefix encodes ancestor-descendant relationships in the XML document tree. We call this B+Tree the D-Ancestorship B+Tree.
2. Among all nodes satisfying D-Ancestorship, we are interested in those satisfying S-Ancestorship as well. We create labels for suffix tree nodes so that we can tell S-Ancestorship between two nodes by their labels. We use B+Trees to index nodes by labels. Such B+Trees are known as S-Ancestorship B+Trees.

We determine the D-Ancestorship between two elements by checking their prefixes. However, determining S-Ancestorship between two elements requires additional information. We label each suffix tree node x by a pair $(n_x, size_x)$, where $n_x$ is the prefix traversal order of x in the suffix tree, and $size_x$ is the total number of descendants of x in the suffix tree. Labeling can be accomplished by making a depth-first traversal of the suffix tree. An example of such labeling is shown in FIG. 5. With the labeling, the S-Ancestorship between any two nodes can be decided easily: if x and y are labeled $(n_x,size_x)$ and $(n_y,size_y)$ respectively, node x is an S-Ancestor of node if and only if $n_y \in (n_x, n_x+size_x]$.

To construct the B+Trees, we first insert all suffix tree nodes into the D-Ancestorship B+Tree using their (Symbol, Prefix) as keys. For all nodes x inserted with the same (Symbol, Prefix), we index them by an S-Ancestorship B+Tree, using the $n_x$ values of their labels as keys.

In addition, we also build a DocId B+Tree, which stores, for each node x (using $n_x$ as the key), the document IDs of those XML sequences that end up at node x when they are inserted into the suffix tree.

Figure 6:
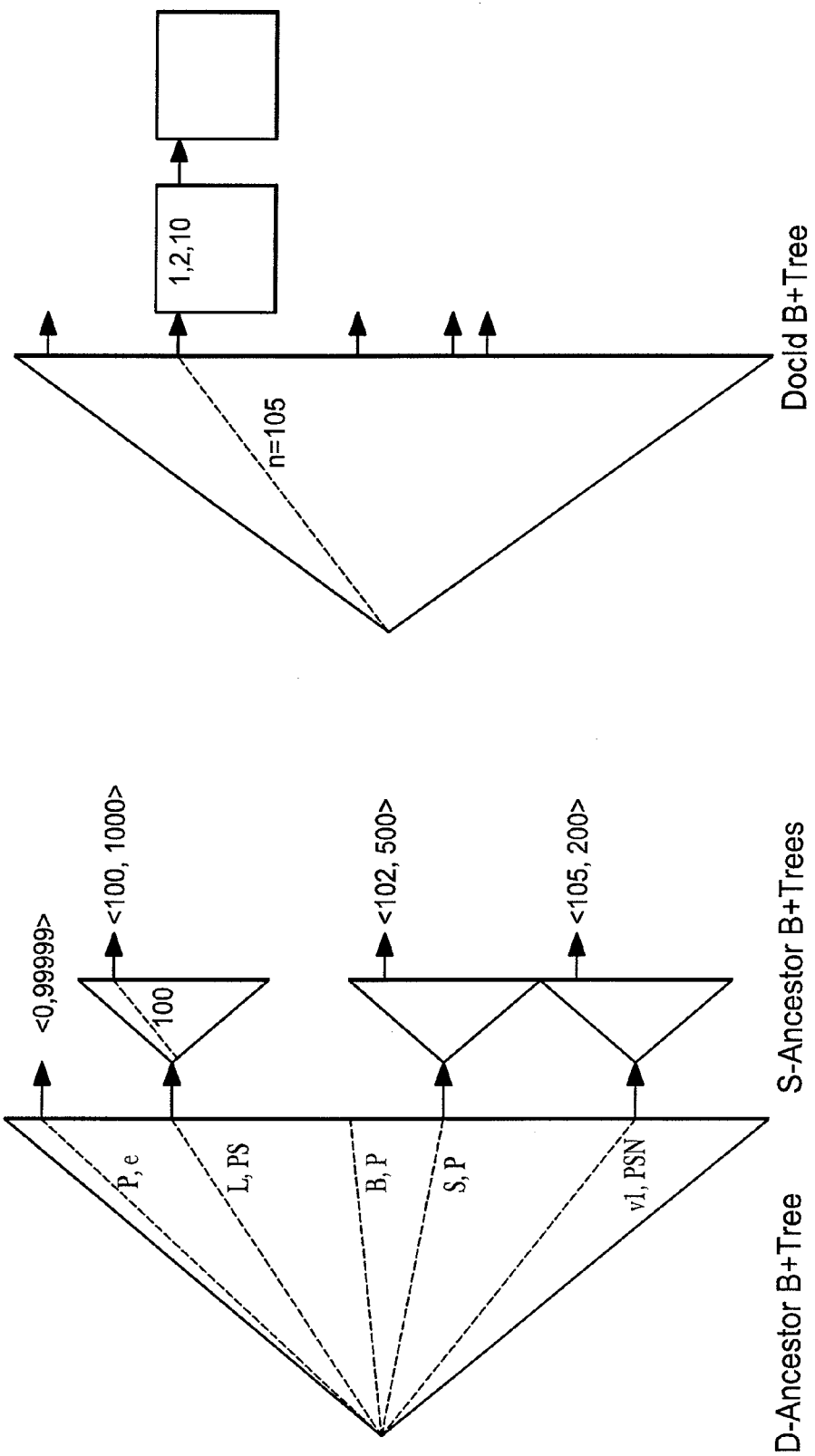
FIG. 6 shows an index structure of RIST, in accordance with one embodiment of the present invention.

FIG. 6 shows the index structure of RIST. In summary, the construction of the index structure takes three steps: 1) adding all structure-encoded sequences into a suffix tree; 2) labeling the suffix tree by making a preorder traversal; and 3) for each node (Symbol, Prefix) labeled (n,size), inserting it to the D-Ancestor B+Tree using (Symbol, Prefix) as the key, and then the S-Ancestor B+Tree using n as the key.

Suppose node x, labeled with $(n_x, size_x)$, is one of the nodes matching a query prefix $q1, \ldots, q_{i-1}$. To match the next element $q_i$ in the query, we consult the D-Ancestor B+Tree using $q_i$ as a key. The D-Ancestor B+Tree returns the root of an S-Ancestor B+Tree. We then issue a range query $n_x < n \leq n_x + size_x$ on the S-Ancestor B+Tree to find the descendants of x immediately. For each descendant, we use the same process to match symbol $q_{i+1}$, until we reach the last element of the query.

If node y is one of the nodes that matches the last element in the query, then the document IDs associated with y or any descendant node of y are answers to the query. Based on y's label, say $(n_y, size_y)$, we know y's descendants are in the range of $(n_y, n_y + size_y]$. Thus, we perform a range query $[n_y, n_y + size_y]$ on the DocId B+Tree to retrieve all the document IDs for y and y's descendants.

The algorithm below formalizes the querying process:

```
Input: Q = q₁, ... ,qₖ, a query sequence
       D-Ancestor B⁺Tree, index of (symbol, prefix) pairs
       S-Ancestor B⁺Trees, index of (n, size) labels
       DocId B⁺Tree, mapping between the n values in node labels
         and document IDs
Output: all occurrences of Q in the XML data
Search ((0, size), 1); /* (0, size) is the label of the root node of the
                          suffix tree */
Function Search((n, size), i)
if i ≤ |Q| then
    T ← retrieve, from the D-Ancestor B⁺Tree, the S-Ancestor
        B⁺Tree that represents qᵢ;
    N ← retrieve from T, the S-Ancestor B⁺Tree, all nodes with
        range inside (n, n + size];
    for each node c ∈ N do
        Assume c is labeled (n', size');
        Search((n', size'), i + 1);
    end
else
    Perform a range query [n, n + size] on the DocId B⁺Tree to output
    all document IDs in that range;
end
```

If an element in the query sequence contains wild-card '*', more than one S-Ancestor B+Tree may match the element. Let Q=(P,ϵ), (L,P*), (v₂,P*L). To match (L,P*), we issue a range query to the D-Ancestor B+Tree. The key of the D-Ancestor B+Tree is ordered first by the Symbol, then by the length of the Prefix, and lastly by the content of the Prefix. The search then continues on each S-Ancestor B+Tree returned by the range query. Note that we only need to handle (L,P*), or elements whose prefixes end with '*'. This is because the matching of (L,P*) will instantiate the '*' in (v₂,P*L) to a concrete symbol, which means (v₂,P*L) is not considered as a wild-card query. Queries with wild-card '//' are handled as a series of '*' queries. Thus, the index supports wild cards '*' and '//' appearing both in the beginning and in the middle of a query sequence.

In summary, unlike the naive algorithm, RIST does not use suffix trees for subsequence matching. From any node, instead of searching the entire subtree under the node, we can "jump" to the sub nodes that match the next element in the query right away. Thus, RIST supports non-contiguous subsequence matching efficiently. In comparison with many other indexing approaches that break a query down to pieces and then join the results, RIST has the advantage of querying tree structures as a whole.

RIST uses a static scheme to label suffix tree nodes, which prevents it from supporting dynamic insertions. This is because for any node x labeled (n,size), late insertions can change the number of nodes that appear before x (in the prefix order) as well as the size of the subtree rooted at x. This means that neither n nor size can be fixed.

The sole purpose of the suffix tree is to provide a labeling mechanism to encode S-Ancestorships. Suppose a node x is created for element $d_i$ during the insertion of sequence $d_1, \ldots, d_i, \ldots, d_k$. If we can estimate 1) how many different elements will possibly follow $d_i$ in future insertions, and 2) the occurrence probability of each of these elements, then we can label x's child nodes right away, instead of waiting until all sequences are inserted. It also means: 1) the suffix tree itself is no longer needed because its sole purpose of providing a labeling mechanism can be accomplished on the fly; and 2) we can support dynamic data insertion and deletion.

ViST uses a dynamic labeling method to assign labels to suffix tree nodes. Once assigned, the labels are fixed and will not be affected by subsequent data insertion or deletion.

We present a dynamic method for labeling suffix tree nodes without building the suffix tree. The method relies on rough estimations of the number of attribute values and other semantic/statistical information of the XML data. The dynamic scheme presented herein is designed to label suffix trees built for structure-encoded sequences derived from XML document trees.

A tree structure defines nested scopes: the scope of a child node is a sub-scope of its parent node, and the root node has the maximum scope which covers the scope of each node. Initially, the suffix tree contains a single node (root), and we let it cover the entire scope, [0,Max), where Max is the maximum value that the machine can represent under certain precision. Max=$2^{128}-1$ if 8 bytes are used to represent an integer. Alternatively, 16 bytes can be used for Max as large as $2^{256}-1$.

Figure 7:
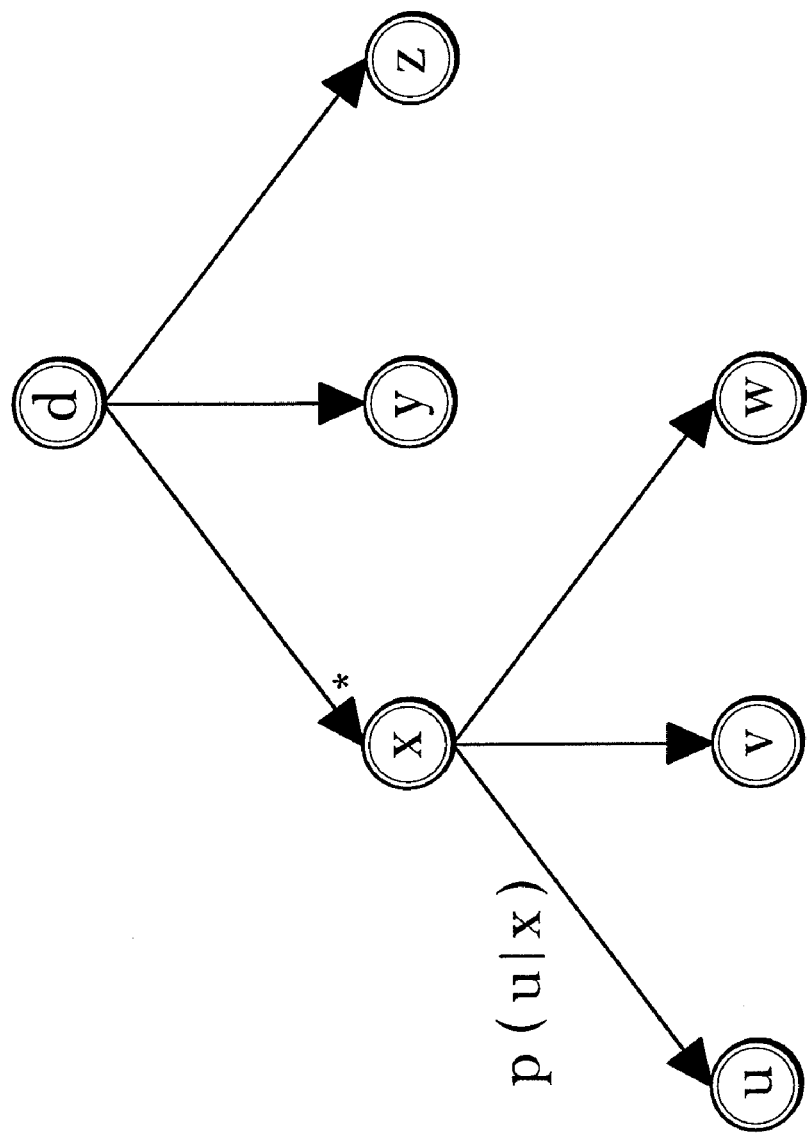
FIG. 7 shows an XML scheme, in accordance with one embodiment of the present invention.

Semantic and statistical clues of structured XML data can often assist sub-scope allocation. FIG. 7 shows a sample XML schema. We use p(u|x) to denote, in an XML document, the probability that node u occurs given node x occurs. For a multiple occurring node v, p(v|x) denotes the probability that at least one v occurs given x occurs in an XML document.

If x is the parent of u, usually it is not difficult to derive or estimate, from the semantics of the XML structure or the statistics of a sample dataset, the probability p(u|x). For instance, if each Buyer has a name, then p(Name|Buyer)=1. If we know that roughly 10% of the items contain at least a sub-item, then p(SubItem|Item)=0.1.

We start with two assumptions: 1) we know probability p(u|x) for all u, where x is the parent of u; and 2) in XML document trees, sibling nodes occur independently of each other. As shown below, the second assumption can be relaxed. If node x appears in an XML document based on the schema in FIG. 7, then each of the following symbols can appear immediately after x in the sequence derived from the document: u, v, w, y, z, and ϵ (i.e., empty). Therefore, empty, x is the last element. These symbols form the "follow set" of x.

A formal definition of a follow set is as follows: Given a node x in an XML scheme, we define the follow set of x as a list. That is follow(x)=$y_1, \ldots, y_k$, where $y_i$ satisfies the following condition: $x < y_i < y_{i+1}$ (according to prefix traversal order) and the parent of $y_i$ is either x or an ancestor node of x.

It is straightforward to one of ordinary skill in the art to prove that only symbols in x's follow set can appear immediately after x. Suppose follow(x)=$y_1, \ldots, y_k$, based on the assumption that sub-nodes occur independently, we have:

$$p(y_i|x)=p(y_i|d), \text{ where d is the parent of } y_i$$

The equation above is trivial if d=x. If d≠x, then based on the definition of the follow set, d must be an ancestor of x. Therefore, $p(y_i|x)=p(y_i|x,d)$. Because x and $y_i$ are in different branches under d, it follows from the assumptions presented above that they occur independently of each other, which means $p(y_i|x,d)=p(y|d)$.

Let follow(x)=$y_1, \ldots, y_k$. The probability that x is followed immediately by $y_1$ is $p(y_1|x)$. The probability that x is followed immediately by $y_2$ is $(1-p(y_1|x))p(y_2|x)$. The probability that x is followed immediately by $y_i$ is (hereinafter referred to as "probability equation"):

$$P_x(y_i) = p(y_i|x) \prod_{k=1}^{i-1} (1 - p(y_k|x))$$

We allocate subscopes for the child nodes in the suffix tree according to the probability. More formally, if x's scope is [l,r), the size of the subscope assigned to $y_i$, the $i^{th}$ symbol in x's follow set, is:

$$s_i=(r-l-1)P_x(y_i)/C$$

where $$C = \sum_{y \in follow(x)-\{\epsilon\}} P_x(y)$$

is a normalization factor. No scope is allocated to $\epsilon$.

In other words, we should assign a subscope $[l_i,r_i) \subset [l,r)$ to $y_i$, where:

$$l_i = l+1+(r-l-1)\sum_{j=1}^{i} P_x(y_j)$$

$$r_i=l_i+s_i$$

In the following situations, the follow set and the probability equation need to be adjusted:

1) A same node can occur multiple times under its parent node. Let ollow(x)=$y_1, \ldots, y_k$. If x occurs multiple times under its parent, then x also appears in follow(x). That is, follow(x)=$y_1, \ldots, x, \ldots, y_k$, where the symbols before x are the descendants of x. Let the probability that an XML document contains n occurrences of x under d is $p_n(x|d)$, then the probability that the (n−1)-th x is followed immediately by the n-th x is $$p_n(x|d) \prod_{k=1}^{i-1} (1 - p(y_k|x)).$$

2) Nodes do not occur independently. The probability equation is derived based on the assumption that nodes occur independently. However, this may not always be true. Suppose, for instance, that in FIG. 7 either u or v must appear under x, and p(u|x)=p(v|x)=0.8. We have follow(x)=u,v because if either u and v must occur, it follows that there is no possibility that any of w, y, z, or $\epsilon$ can immediately follow x. Thus, we have:

$$P_x(u)=p(u|x)=0.8$$

$$P_x(u)=(1-p(u|x))p(v|\neg u,x)=0.2 \times 1=0.2$$

Assume we do not have any statistical information of the data or any semantic knowledge about the schema. All that we can rely on is a rough estimation of the number of different elements that follow a given element. The best we can do is to assume each of these elements occurs at roughly the same rate. This situation usually corresponds to attributes values. For instance, in a certain dataset, we may roughly estimate the number of different values for attribute CountryOfBirth to be 100.

Suppose node x is assigned a scope of [l,r). Node x itself will then take l as its ID, and the remaining scope [l+1,r) is available for x's child nodes. Assume the expected number of child nodes of x is $\lambda$. Without the knowledge of the occurrence rate of each child node, we allocate $$\frac{1}{\lambda}$$

of the remaining scope to x's first inserted child, which will have a scope of size $(r-l-1)/\lambda$. We allocate $$\frac{1}{\lambda}$$

of the remaining scope to x's second inserted child, which will have a scope of size $$\frac{(r-l-1) - \frac{r-l-1}{\lambda}}{\lambda} = (r-l-1)(\lambda-1)/\lambda^2.$$

The third inserted child will use a scope of size $(r-l-1)(\lambda-1)^2/\lambda^3$, and so forth.

Figure 8:
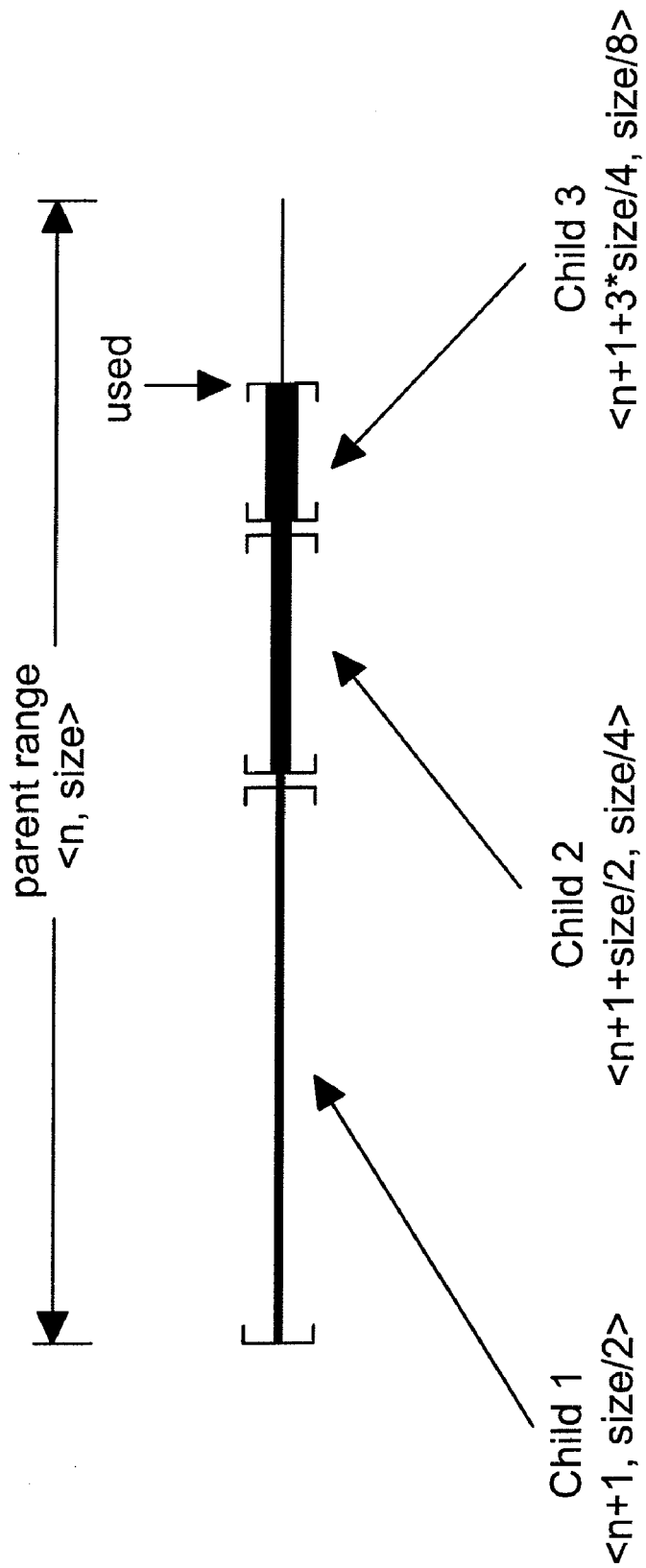
FIG. 8 shows a dynamic range allocation, in accordance with one embodiment of the present invention.

FIG. 8 demonstrates an example of dynamic range allocation with parameter $\lambda=2$. It shows that the $k^{th}$ child is allocated a range that is $1/2^k$ of the parent range in size. As another example, assuming the expected number of sub-nodes of node y is 100, then the ranges of those child nodes that are inserted among the first five occupy 1%, 0.99%, 0.98%, 0.97%, and 0.96% of the parent range respectively. Apparently, the allocation method has a bias that favors nodes inserted earlier.

More formally, according to the above procedure, for a given node x with a range of [l,r], the size of the subrange assigned to its $k^{th}$ child is $$s_k = \frac{(r-l-1) - \sum_{i=1}^{k-1} s_i}{\lambda}.$$

One of ordinary skill in the art can prove that $s_k=(r-l-1)(\lambda-1)^{k-1}/\lambda^k$. In other words, we should assign a subrange $[l_k, r_k) \subset [l,r)$ to the $k^{th}$ child of node x, where:

$$l_k=l-1+(r-l-1)(1-(\lambda-1)^{k-1}/\lambda^{k-1})$$

$$r_k=l_k+s_k$$

Based on the above discussion, dynamic scope is defined as follow. The dynamic scope of a node is a triple <n, size, k>, where k is the number of subscopes allocated inside the current scope. Let the dynamic scopes of x and y be $s_x = <n_x, size_x, k_x>$ and $s_y = <n_y, size_y, k_y>$, respectively. Nodey is a descendant of x if $s_y \subset s_x$. That is, $[n_y, n_y + size_y] \subset [n_x, n_x + size_x]$.

Let $T = t_1, \ldots, t_k$ be a sequence. Each $t_i$ corresponds to a node in the suffix tree. Assume the size of the dynamically allocated scopes decreases on average by a factor of Y every time we descend from a parent node to a child node. As a result, the size of $t_i$'s scope comes to $Max/Y^{i-1}$, where Max is the size of the root node's scope. Apparently, for a large enough i, $Max/Y^{i-1} \to 0$. This problem is known as scope underflow.

As we have mentioned, XML databases such as DBLP and IMDB are composed of records of small structures. For databases with large structures, such as XMARK, we break down the structure into small sub structures, and create an index for each of them. Thus, we limit the average length of the derived sequences.

If scope underflow still occurs for a given sequence $\cdot T = t_1, \ldots, t_k$ at $t_i$, we allocate a subscope of size k−i+1 from node $t_{i-1}$, and label each element $t_i, \ldots, t_k$ sequentially. If node $t_{i-2}$ cannot spare a subscope of size k−i+1, we allocate a subscope of size k−1+2 from node $t_{i-2}$, and so forth. Intuitively, we borrow scopes from the parent nodes to solve the scope underflow problems for the descendent nodes. To do this, we preserve a certain amount of scope in each node for this unexpected situation, such that it does not interfere with the dynamic labeling process, as described in greater detail above. Using this method, the involved nodes are labeled sequentially (each node is allocated a scope for only one child), and they cannot be shared with other sequences. However, they are still properly indexed for matching.

The dynamic labeling algorithm and the index construction algorithm of ViST will now be presented. ViST uses the same sequence matching algorithm as RIST, as described in greater detail above.

The algorithm below outlines the top-down dynamic range allocation method described above. The labeling is based on a virtual suffix tree, which means it is not materialized.

---

Input: p: parent scope
      e: symbol for which a subscope is to be created
Output: s, a subscope inside the parent scope p
      p, updated parent scope
Assume p = (n, size, k);
if semantical/statistical clues for e is available then
    Assume e is the $i^{th}$ symbol in the follow set of e's parent node;
    s ← ($l_i, s_i, 0$);   /* $l_i$ and $s_i$ are defined in Eq(4)
                         and Eq(3) respectively */
else
    s ← ($l_k, s_k, 0$);   /* $l_k$ and $s_k$ are defined in Eq(6)
                         and Eq(5) respectively */
end
p ← (n, size, k + 1);
return s;

---

We use an example to demonstrate the process of inserting a structure-encoded sequence into the index structure. Suppose, before the insertion, the index structure already contains the following sequence:

$$Doc_1 = (P, \epsilon)(S,P)(N,PS)(v_1, PSN)(L,PS)(v_2, PSL)$$

The sequence to be inserted is $$Doc_2 = (P, \epsilon)(S,P)(L,PS)(v_2, PSL)$$

Figure 9:
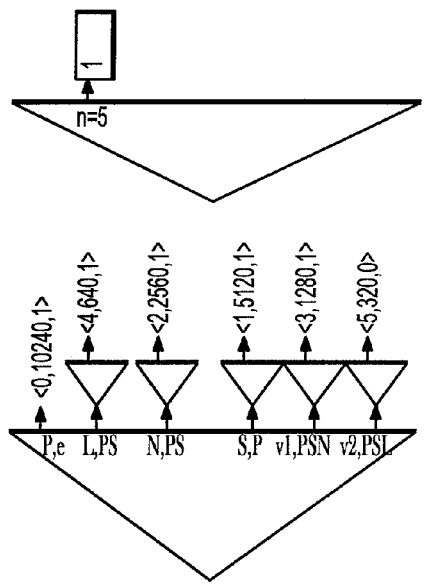
FIG. 9(*a*) shows an index prior to insertion, in accordance with one embodiment of the present invention.
Figure 9:
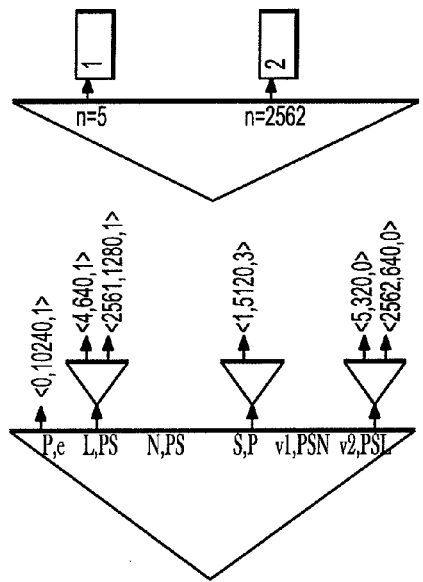

The index before the insertion of Doc2 is shown in FIG. 9(a). For presentation simplicity, we make two assumptions: 1) Max=20480, that is, the root node covers a scope of [0, 20480); and 2) there are no semantic/statistical clues available and the top-down dynamic scope allocation method uses a fixed parameter λ=2 for all nodes.

The insertion process is much like that of inserting a sequence into a suffix tree. That is, we follow the branches, and when there is no branch to follow, we create one. We start with node (P,ε), and then (S,P), which has scope <1, 5120, 1>. Next, we search in the S-Ancestor B$^+$Tree of (L,PS) for all entries that are within the scope of [2, 5120).

The only entry there, <4, 640, 1>, is apparently not an immediate child of <1, 5120, 1>. As a result, we insert a new entry <2561, 1280, 1>, which is the 2nd child of (S,P), in the S-Ancestor B$^+$Tree of (L,PS). The scope for the (S,P) node is updated to <1, 5120, 2>, as it has a new child now. Similarly, when we reach (v$_2$,PSL), we insert a new entry <2562, 640, 0>. Finally, we insert key 2562 into the DocId B$^+$Tree for Doc$_2$. The resulting index is shown in FIG. 9(b).

The algorithm below details the process of inserting an XML sequence into the index structure.

---

Input: T: a structure-encoded sequence
      id: ID of the XML document represented by T
Output: updated index file F
Assume T = ($a_1, l_1$), ... , ($a_i, l_i$), ... , ($a_k, l_k$);
s ← (0, Max, k); /* s is the scope of the root node of the virtual
                                  suffix tree */
i ← 1;
while i ≤ k do
    Search key ($a_i, l_i$) in the D-Ancestor B$^+$Tree;
    if found then
        e ← the S-Ancestor B$^+$Tree associated with ($a_i, l_i$);
    else
        e ← new S-Ancestor B$^+$Tree;
        Insert e into the D-Ancestor B$^+$Tree with key ($a_i, l_i$);
    end
    Search in e for scope r such that r is an immediate child scope of s;
    if not found then
        r ← (n, size, k) ← subScope (s, $a_i$);
        Insert (n, size) into S-Ancestor B$^+$Tree e with n as key;
    end
    s ← r;
    i ← r + 1;
end
Assume s = (n, size, k);
Insert (n, id) into the DocId B$^+$Tree;

---

In conclusion, the ViST, a dynamic indexing method for XML documents, has been described in detail herein. We convert XML data, as well as structured XML queries to sequences that encode their structural information. Efficient sequence matching algorithms are introduced to find XML documents that contain the structured queries. While currently known XML indexing methods have difficulty in handling queries containing branches, insofar as most of them first disassemble a structured query into multiple sub-queries, each handling a single path in the structured query, and then join the results of the sub-queries to provide the final answers, ViST uses the structures as the basic unit of query, which enables us to process, through sequence matching, structured queries as a whole, and as a result, to avoid expensive join operations. In addition, ViST supports dynamic insertion of XML documents through the top-down scope allocation method. Finally, the index structure of ViST is entirely based on B+Trees, which, unlike some specialized data structures used in other approaches, are well supported by DBMSs.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of answering an XML query, comprising:
   receiving an XML query;
   transforming the XML query into a structure-encoded sequence;
   searching a virtual suffix tree (ViST) structure using the structure-encoded sequence and returning one or more document IDs,
   wherein searching a ViST structure using the structure encoded sequence, comprises:
   (a) assuming the query sequence is <$q_1, q_2, \ldots, q_n$>;
   (b) assigning. i=1,begin=0,end=infinity;
   (c) searching a D-Ancestor B+Tree using key $q_i$, which returns an S-Ancestor B+Tree; and
   (d) performing a range search (begin,end) on the S-Ancestor B+Tree, wherein performing the range search comprises:
   (e) returning a set of ranges ($x_1,y_1$), ..., ($x_n,y_n$);
   (f) for each ($x_i,y_i$) doing (g) and (h);
   (g) if (i=n) then performing a range query ($x_i,y_i$) on the doc-ID index and returning one or more document IDs;
   (h) if (i<n) then assigning i=i+1; begin=$x_i$, end=$y_i$; going to (c).

2. A machine-readable medium having instructions stored thereon for execution by a processor to perform a method answering an XML query, comprising the steps of:
   receiving an XML query;
   transforming the XML query into a structure-encoded sequence;
   searching a virtual suffix tree (ViST) structure using the structure-encoded sequence and returning one or more document IDs,
   wherein searching a ViST structure using the structure encoded sequence. comprises:
   (a). assuming the query sequence is <$q_1, q_2, \ldots, q_n$>;
   (b) assigning. i=1,begin=0,end=infinity;
   (c) searching a D-Ancestor B+Tree using key $q_i$, which returns an S-Ancestor B+Tree; and
   (d) performing a range search (begin,end) on the S-Ancestor B+Tree, wherein performing the range search comprises:
   (e) returning a set of ranges ($x_1,y_1$), ..., ($x_n,y_n$);
   (f) for each ($x_i,y_i$) doing (g) and (h);
   (g) if (i=n) then performing a range query ($x_i,y_i$) on the doc-ID index and returning one or more document IDs;
   (h) if (i<n) then assigning i=i+1, begin=$x_i$, end=$y_i$; going to (c).

* * * * *